United States Patent
Ito

(10) Patent No.: US 7,629,431 B2
(45) Date of Patent: Dec. 8, 2009

(54) POLYCARBONATE PREPOLYMER FOR SOLID PHASE POLYMERIZATION AND PROCESS FOR PRODUCING POLYCARBONATE

(75) Inventor: Mitsunori Ito, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 464 days.

(21) Appl. No.: 10/546,527

(22) PCT Filed: Feb. 20, 2004

(86) PCT No.: PCT/JP2004/001992

§ 371 (c)(1),
(2), (4) Date: Nov. 29, 2007

(87) PCT Pub. No.: WO2004/076527

PCT Pub. Date: Sep. 10, 2004

(65) Prior Publication Data

US 2008/0064847 A1    Mar. 13, 2008

(30) Foreign Application Priority Data

Feb. 28, 2003    (JP) .............................. 2003-052571

(51) Int. Cl.
*C08G 64/00*    (2006.01)
*C08G 63/02*    (2006.01)

(52) U.S. Cl. ...................... 528/196; 502/162; 502/164; 528/198; 528/204

(58) Field of Classification Search ................. 528/196, 528/198, 204; 502/162, 164
See application file for complete search history.

(56) References Cited

U.S. PATENT DOCUMENTS 6,399,738 B1    6/2002    Ito

FOREIGN PATENT DOCUMENTS

WO    90/07536    7/1990

*Primary Examiner*—Terressa M Boykin
(74) *Attorney, Agent, or Firm*—Oblon, Spivak, McClelland, Maier & Neustadt, L.L.P.

(57) ABSTRACT

A polycarbonate prepolymer for solid state polymerization, which is produced by an oxidative carbonylation reaction of an aromatic dihydroxy compound, a monohydric phenol having a boiling point of 330° C. or below, carbon monoxide and oxygen, the polycarbonate prepolymer being characterized by that (a) a ratio of aryl carbonate groups and hydroxyl groups each constituting terminal groups of the prepolymer is from 2:8 to 8:2, and (b) a molecular weight distribution (Mw/Mn) is from 1.1 to 2.1; and a process of producing polycarbonates including a step of solid state-polymerizing the prepolymer so as to increase the molecular weight thereof. According to the present invention, the prepolymer having a controlled molecular weight distribution suitable for solid state polymerization is provided, and a high quality polycarbonate is efficiently produced in environmentally friend manner.

10 Claims, No Drawings

POLYCARBONATE PREPOLYMER FOR SOLID PHASE POLYMERIZATION AND PROCESS FOR PRODUCING POLYCARBONATE

TECHNICAL FIELD

The present invention relates to a polycarbonate prepolymer for solid state polymerization and a process for producing polycarbonates and, particularly, relates to a polycarbonate prepolymer for solid state polymerization and a process for producing polycarbonates therefrom, by which a high quality polycarbonates, which are useful resin materials in an electric-electronics field, an automobile field, an optical field, a structural material field and so forth, can be produced efficiently as well as environment-friendly.

BACKGROUND ART

For producing polycarbonates, known are a process of directly reacting an aromatic dihydroxy compound such as bisphenol A with phosgene (interfacial polycondensation), a process of transesterifying an aromatic dihydroxy compound such as bisphenol A with a carbonic diester such as diphenyl carbonate in melt state or solid state (a melt process, a solid state process, respectively) and so forth.

However, in the interfacial polycondensation, there have been problems such as requirement of using toxic phosgene and occurrence of corrosion in production apparatus caused by chlorine-containing by-products such as sodium chloride. The conventional transesterifying process needs complicated processes for producing carbonic diester as a raw material. Such a production process including a raw material production process, a recycle process of by-products and so forth in total is less economical.

The solid state process has been attracted as a process of giving products with superior quality and an environmentally friend process since it requires no halogen solvents such as methylene chloride, and it requires a lower polymerization temperature than that of the melt process.

In the solid state process, it has been desired that a prepolymer was produced through a melt process and then modified so as to have the specific property by using a poor solvent such as acetone (JP 3-22330A). However, in this process, it was difficult to control the molecular weight distribution of prepolymer because it was produced by the melt process, therefore, the increase of molecular weight in the solid state polymerization was not enough.

Further proposed is a method in which prepolymer was produced through an oxidative carbonylation reaction and then the molecular weight thereof was increased by transesterification (JP 2000-281769). However, in this method, there have been problems to be solved, such as difficulty of separating and recovering the prepolymer, because the physical property of the prepolymer was not controlled and homogeneous catalyst was used.

DISCLOSURE OF THE INVENTION

The present invention has been made in view of the aforementioned situations, and its objective is to provide a prepolymer having a controlled molecular weight distribution and to produce a high quality polycarbonate efficiently in an environmentally friend manner.

The inventors have extensively studied, in view of the aforementioned situations, so as to develop a process to produce a high quality polycarbonate efficiently in an environmentally friend manner, and, as a result, have found that the above objective is attained by increasing the molecular weight of a polycarbonate prepolymer for solid state polymerization having the specific physical property, which is produced by an oxidative carbonylation reaction of an aromatic dihydroxy compound, a monohydric phenol having a boiling point of 330° C. or below, carbon monoxide and oxygen. The present invention has been accomplished on the basis of such findings.

Thus, the present invention is to provide the following polycarbonate prepolymer for solid state polymerization and process of producing polycarbonates.

(1) A polycarbonate prepolymer for solid state polymerization, which is produced by an oxidative carbonylation reaction of an aromatic dihydroxy compound, a monohydric phenol having a boiling point of 330° C. or below, carbon monoxide and oxygen, the polycarbonate prepolymer being characterized by that:

(a) a ratio of aryl carbonate groups and hydroxyl groups each constituting terminal groups of the prepolymer is from 2:8 to 8:2, and (b) a molecular weight distribution (Mw/Mn) is from 1.1 to 2.1.

2) The polycarbonate prepolymer for solid state polymerization as defined in (1), wherein a number average molecular weight (Mn) is from 1000 to 10000.

(3) The polycarbonate prepolymer for solid state polymerization as defined in (1) or (2), wherein the oxidative carbonylation reaction is conducted in the presence of a catalyst composition containing a carrier to which at least one compound selected from (a) a metal complex, (b) a compound having redox catalytic ability and (c) a compound capable of activating the aromatic hydroxy compound is bonded.

(4) A process of producing polycarbonates including a step of solid state-polymerizing the polycarbonate prepolymer for solid state polymerization as defined in (1), (2) or (3), thereby increasing a molecular weight thereof.

BEST MODES OF CARRING OUT THE INVENTION

First of all, (A) a polycarbonate prepolymer for solid state polymerization of the present invention is described and followed by (B) the description of a process of producing polycarbonates.

(A) Polycarbonate Prepolymer for Solid State Polymerization (A-1) Starting Materials for Polycarbonate Prepolymer The aromatic dihydroxy compounds for producing the polycarbonate prepolymer are represented by the following formula (I):

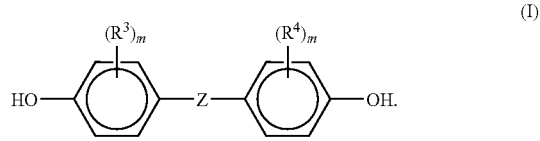

In the formula (I), each of $R^3$ and $R^4$ represents a halogen atom such as fluorine, chlorine, bromine and iodine, or an alkyl group having from 1 to 8 carbon atoms such as methyl group, ethyl group, n-propyl group, isopropyl group, n-butyl group, isobutyl group, sec-butyl group, t-butyl group, pentyl group, hexyl group, cyclohexyl group, heptyl group, and octyl group. $R^3$ and $R^4$ may be the same or different from each other. Plural $R^3$ groups, if any, may be the same or different from each other, and also, plural $R^4$ groups, if any, may be the same or different from each other. Each of m and n represents an integer of from 0 to 4. Z represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, a bond of —S—, —SO—, —SO$_2$—, —O— or —CO—, or a bond represented by the following formula (II), (II'), (II") or (II'''):

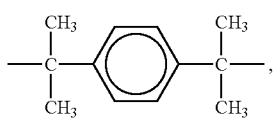
(II)

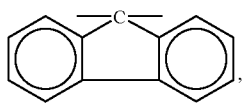
(II')

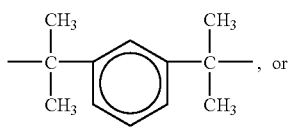
(II")

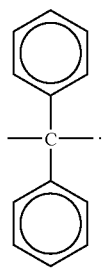
(II''')

Examples of the alkylene group having from 1 to 8 carbon atoms and the alkylidene group having from 2 to 8 carbon atoms include methylene group, ethylene group, propylene group, butylene group, pentylene group, hexylene group, ethylidene group, and isopropylidene group. Examples of the cycloalkylene group having from 5 to 15 carbon atoms and the cycloalkylidene group having from 5 to 15 carbon atoms include cyclopentylene group, cyclohexylene group, cyclopentylidene group, and cyclohexylidene group.

Although the formula (I) includes various aromatic dihydroxy compounds, in particular, 2,2-bis(4-hydroxyphenyl)propane (bisphenol A) is preferable. Dihydric phenols other than bisphenol A may include bis(4-hydroxyphenol) compounds other than bisphenol A such as 1,1-bis(4-hydroxypheny)methane, 1,1-bis(4-hydroxypheny)ethane, 9,9-bis(4-hydroxyphenyl)fluorene, 9,9-bis(3-methyl-4-hydroxyphenyl)fluorene, bis(4-hydroxyphenyl)cycloalkane, bis(4-hydroxyphenyl)sulfide, bis(4-hydroxyphenyl)sulfone, bis(4-hydroxyphenyl)sulfoxide, bis(4-hydroxyphenyl)ether, and bis(4-hydroxyphenyl)ketone; and halogenated bisphenols such as 2,2-bis(3,5-dibromo-4-hydroxyphenyl)propane and 2,2-bis(3,5-dichloro-4-hydroxyphenyl)propane. These phenols may have an alkyl substituent, with alkyl groups having from 1 to 8 carbon atoms being preferred, and alkyl groups having from 1 to 4 carbon atoms being particularly preferred. These aromatic dihydroxy compounds may be used singly or in combination of two or more.

The production of the prepolymer is performed in the presence of the monohydric phenol having a boiling point of 330° C. or below in addition to the aromatic dihydroxy compound.

Examples of the monohydric phenol having a boiling point of 330° C. or less include phenol (181° C.), o-cresol (191° C.), m-cresol(202° C.), p-cresol(202° C.), p-tert-buthylphenol (237° C.), p-tert-octylphenol (276° C.), p-tert-amylphenol (255° C.), p-methoxyphenol (243° C.), p-chlorophenol (220° C.), trichlorophenol (246° C.), and p-bromophenol (235° C.).

Of these monohydric phenols, p-tert-butyl phenol (hereinafter sometimes referred to as PTBP) is preferred because it causes no side reaction. The aromatic dihydroxy compounds and the monohydric phenols may be used singly or in combination of two or more, respectively.

Carbon monoxide to be reacted with the aromatic dihydroxy compound and the monohydric phenol may be used in a pure form, a diluted form with inert gas, or a mixture with hydrogen. Oxygen to be reacted with the aromatic dihydroxy compound and the monohydric phenol may be pure oxygen or an oxygen-containing gas such as air.

(A-2) Catalyst for Producing Prepolymer

In the present invention, an oxidative carbonylation reaction of the aromatic dihydroxy compound, the monohydric phenol, carbon monoxide and oxygen is conducted preferably in the presence of a catalyst composition containing a carrier to which at least one compound selected from the group consisting of (a) a metal complex, (b) a compound having redox catalytic ability and (c) a compound capable of activating the aromatic hydroxy compound is bonded. The catalyst composition is preferably represented by the following formula (III):

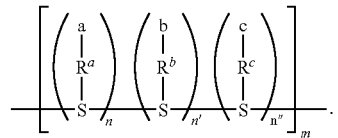
(III)

In the formula (III), "a", "b" and "c" respectively represent the component (a), the component (b) and the component (c) mentioned above. Each of $R^a$, $R^b$ and $R^c$ represents a covalent bond or a substituent group having 0 or more carbon atoms through which the component (a), the component (b) and the component (c) are bonded to the carrier. Specific examples thereof include a single bond, a double bond, a triple bond, a bifunctional saturated or unsaturated hydrocarbon group having from 1 to 20 of carbon atoms, a bifunctional aromatic hydrocarbon group having from 6 to 20 carbon atoms (each hydrocarbon group may contain a hetero atom, a metal atom, etc.), a bi-, tri- or a tetrafunctional substituent selected from the group consisting of ester bond, ether bond, thioester bond, thioether bond, amino bond, urea bond, amide bond, imide bond, and combinations of the preceding bonds. The bifunctional substituent, the trifunctional substituent and the tetrafunctional substituent may have a substituent group.

The series of S represents a carrier composed of a compound having one or more atoms of one or more kinds, selected from the group consisting of carbon, boron,. nitrogen, oxygen, phosphorous, silicon, sulfur, aluminum, zirconium, and titanium. Plural groups of at least one kind of $R^a$, $R^b$ and $R^c$ may bond to the same S radially or sequentially. The suffixes of n, n' and n" may be the same or different and are each independently an integer of 0 or more and a total thereof is an integer of 1 or more. The suffix m is an integer of 1 or more.

Examples of the component (a) represented by "a" in the formula (III) include any metal complexes as long as the metal complex is composed of one or more nuclear metals of palladium atom alone and organic ligands, or the metal complex is composed of two or more nuclear metals of palladium atom and metal atom other than palladium atom and organic ligands. In case that the nuclear metals are two or more metal atoms including palladium atom, the metal atoms may be directly bonded to each other through a metal bond or indirectly bonded to each other through an organic ligand. Any types of organic ligand may be suitable as long as it contains at least one structure selected from the group consisting of phosphine structure, phosphite structure, phosphoric ester structure, pyridine structure, imine structure, amine structure, nitrile structure, arsine structure, and carbonyl structure, which are generally known as the ligand of palladium complex and the forth. Examples of the organic ligands having plural structures include compounds having plural phosphine structures, compounds having plural pyridine structures, compounds having plural imine structures, compounds having plural amine structures, compounds having plural nitrile structures, compounds having plural carbonyl structures, compounds having phosphine structure and pyridine structure, and compounds having arsine structure and pyridine structure. As specific examples of there compounds, the following organic ligand may be mentioned when represented by "a" in the formula (III) which is not bonded to $R^a$ (namely, "a" bonded to hydrogen in place of $R^a$).

Compounds having one organic ligand structure may include triphenylphosphine, tricyclohexylphosphine, tri-n-butylphosphine, triphenylphosphite, pyridine, alkylpyridine, hydroxypyridine, quinoline, acetonitrile, benzonitrile and the like. Compounds having plural organic ligand structures may include bis(diphenylphosphino)methane, 1,2-bis(diphenylphosphino)ethane, 1,3-bis(diphenylphosphino)propane, 1,4-bis(diphenylphosphino)butane, bis(diphenylarsino)methane, 1,2-bis(diphenylarsino)ethane, 1,3-bis(diphenylarsino)propane, 2,2'-biquinoline, 4,4'-dimethyl-2,2'-biquinoline, 2,2'-bipyridine, 6,6'-dimethyl-2,2'-bipyridine, phenanthroline, 2,9-dimethylphenanthroline, adiponitrile, phtalonitrile, pyridylnitrile, 2-diphenylphosphinopyridine, di-2-pyridylphenylphosphine, tri-2-pyridylphosphine, 2-diphenylphosphinoquinoline, 2-diphenylarsinopyridine, 1,2-di(phenylimino)ethane, 1,2-bis(dialkylphenylimino)ethane, 1,2-bis(trialkylphenylimino)ethane, 2,3-di(phenylimino)butane, 2,3-bis(dialkylphenylimino)butane, 2,3-bis(trialkylphenylimino)butane, acetylacetone, derivatives of these organic ligand having a substituent, position isomers thereof and the like.

These organic ligands bond to the carrier through $R^a$ as shown in the formula (III). The bonding position may be in any position and may be suitably selected as long as not adversely affecting the reaction.

As described above, the metal complex for the component (a) of the catalyst composition for producing the prepolymer is not particularly limited as long as the metal complex is composed of one or more nuclear metals of palladium atom alone and the organic ligand, or composed of two or more nuclear metals of palladium atom and metal atom other than palladium atom and the organic ligand. As specific examples of the metal complexes, the following metal complexes may be mentioned when represented by "a" in the formula (III) which is not bonded to $R^a$ (namely, "a" bonded to hydrogen in place of $R^a$).

Examples of the metal complexes having a single nuclear metal of palladium atom include tetrakis(triphenylphosphine)palladium, dichlorobis(triphenylphosphine)palladium, dibromobis(triphenylphosphine)palladium, dichlorobis(pyridine)palladium, dibromobis(pyridine)palladium, dichlorobis(quinoline)palladium, dibromobis(quinoline)palladium, dichlorobis(acetonitrile)palladium, dichlorobis(benzonitrile)palladium, (2,2'-biquinoline)palladium dichloride, (4,4'-dimethyl-2,2'-biquinoline)palladium dichloride, (dipotassium 2,2'-biquinoline-4,4'-dicarboxylate)palladium dichloride, (dimethyl 2,2'-biquinoline-4,4'-dicarbxylate)palladium dichloride, (6,7-dihydro-5,8-dibenzo[b,j][1,10]phenanthroline)palladium dichloride, (2,9-dimethyl-1,10-phenanthroline)palladium dichloride, (2,9-diphenyl-1,10-phenanthroline)palladium dichloride, (2,9-di-t-butyl-1,10-phenanthroline)palladium dichloride, (6,6'-dimethyl-2,2'-bipyridyl)palladium dichloride, (6,6'-diphenyl-2,2'-bipyridyl)palladium dichloride, (6,6'-di-t-butyl-2,2'-bipyridyl)palladium dichloride, (2,2'-biquinoline)palladium dibromide, (4,4'-dimethyl-2,2'-biquinoline)palladium dibromide, (dipotassium 2,2'-biquinoline-4,4'-dicarbxylate)palladium dibromide, (dimethyl 2,2'-biquinoline-4,4'-dicarboxylate)palladium dibromide, (2,9-dimethyl-1,10-phenanthroline)palladium dibromide, (2,9-di-t-butyl-1,10-phenanthroline)palladium dibromide, (6,6'-dimethyl-2,2'-bipyridyl)palladium dibromide, (2,2'-biquinoline)palladium diiodide, (4,4'-dimetyl-2,2'-biquinoline)palladium diiodide, (dipotassium 2,2'-biquinoline-4,4'-dicarbxylate)palladium diiodide, (2,9-dimethyl-1,10-phenanthroline)palladium diiodide, (2,9-di-t-butyl-1,10-phenanthroline)palladium diiodide, (6,6'-dimethyl-2,2'-bipyridyl)palladium diiodide, [1,2-bis(dialkylphenylimino)ethane]palladium dichloride, and [2,3-bis(dialkylphenylimino)butane]palladium dichloride.

Examples of the metal complexes having two or more nuclear metals of palladium atoms include dichlorobis[bis(diphenylphosphino)methane]dipalladium, dibromobis [bis(diphenylphosphino)methane]dipalladium, dinitritobis [bis(diphenylphosphino)methane]dipalladium, diazidobis [bis(diphenylphosphino)methane]dipalladium, dicyanatobis[bis(diphenylphosphino)methane]dipalladium, diisocyanatobis[bis(diphenylphosphino)methane]dipalladium, dichlorobis(2-diphenylphosphinopyridine)dipalladium, dibromobis(2-diphenylphosphinopyridine)dipalladium, dinitritobis(2-diphenylphosphinopyridine)dipalladium, diazidobis(2-diphenylphosphinopyridine)dipalladium, dicyanatobis(2-diphenylp hsophinopyridine)dipalladium, diisocyanatobis(2-diphenylphosphinopyridine)dipalladium, dichlorobis(2-diphenylphosphinoquinoline)dipalladium, dibromobis(2-diphenylphosphinoquinoline)dipalladium, dinitritobis(2-dephenylphosphinoquinoline)dipalladium, diazidobis(2-dephenylphosphinoquinoline)dipalladium, dicyanatobis(2-dephenylphosphinoquinoline)dipalladium, diisocyanatobis(2-dephenylphosphinoquinoline)dipalladium, dichlorobis (tri-2-pyridylphosphine)dipalladium, dibromobis(tri-2-pyridylphosphine)dipalladium, dinitritobis(tri-2-pyridylphosphine)dipalladium, diazidobis(tri-2-pyridylphosphine)dipalladium, dicyanatobis(tri-2-pyridylphosphine)dipalladium, diisocyanatobis(tri-2pyridylphosphine)dipalladium, dichlorobis(2-diphenylarsinopyridine)dipalladium, dibromobis(2-diphenylarsinopyridine)dipalladium, dinitritobis(2-diphenylarsinopyridine)dipalladium, diazidobis(2-diphenylarsinopyridine)dipalladium, dicyanatobis(2-diphenylarsinopyridine)dipalladium, diisocyanatobis(2-diphenylarsinopyridine)dipalladium, and tetrachlorobis(2-diphenylphosphonopyridine)tripalladium.

The metal complex having two or more nuclear metals of palladium atom and metal atom other than palladium atom is not specifically limited as long as it is a polynuclear metal complex having a palladium atom and a metal atom other than palladium atom. The metal atom other than palladium atom is preferably tin, titanium, iron, zirconium, molybdenum, cobalt, nickel, ruthenium, rhodium, iridium, platinum, copper, silver, gold, zinc, aluminum, lead, and the like. The numbers of palladium atoms and metal atoms other than palladium atom in such a metal complex are one or more, respectively.

Examples of such metal complexes include bis[(bisdiphenylphosphino)methane](trichlorotin)dipalladium chloride, bis[(bisdiphenylphosphino)methane]bis(trichlorotin)dipalladium, bis[(bisdiphenylphosphino)methane](trichlorotitanuim)dipalladium chloride, bis[(bisdiphenylphosphino)methane]bis(trichlorotitanium)dipalladium, bis[(bisdiphenylphosphino)methane](dichloroiron)dipalladium chloride, bis[(bisdiphenylphosphino)methane]bis(dichloroiron)dipalladium, bis[(bisdiphenylphosphino)methane](trichlorotin)(trichlorotitanium)-dipalladium, bis[(bisdiphenylphosphino)niethane]trichlorotin)(trichloroiron)dipalladium, bis[(bisdiphenylphosphino)methane](trichlorotitanium)(dichloroiron)-dipalladium, π-ally(triphenylphosphine)(trichlorotin)palladium, π-ally(triphenylphosphine)(trichlorotitanium)palladium, π-ally(triphenylphosphine)(dichloroiron)palladium, bis(trichlorotin)palladium, bis(trichlorotitanium)palladium, bis(trichloroiron)palladium, dichlorocalbonyliridiumbis(2-diphenylphosphinopridine)palladium chloride, dichlorocalbonyliridiumbis[(bisdiphenylphosphino)methane]palladium chloride, carbonyliridiumbis [(bisdiphenylphosphino)methane]palladium chloride, dichlorocarbonylrhodiumbis(2-diphenylphosphinopyridine)palladium chloride, dichlorocarbonylrhodiumbis[(bisdiphenylphosphino)methane]palladium chloride, carbonylrhodiumbis[(bisdiphenylphosphino)methane]palladium chloride, trichlorodicarbonylrutheniumbis(2-diphenylphosphinopiridine)palladium chloride, trichlorodicarbonylrutheniumbis[(bisdiphenylphosphino)methane]palladium chloride, chlorodicarbonylrutheniumbis[(bisdiphenylphosphino)methane]palladium chloride, chloroplatinumbis(2-diphenylphosphinopyridine)palladium chloride, chloroplatiumbis[(bisdiphenylphosphino)methane]palladium chloride, chloronickelbis(2-diphenylphosphinopyridine)palladium chloride, and chloronickelbis[(bisdiphenylphosphino)methane]palladium chloride.

In producing the prepolymer, the metal complexes as the component (a) of the catalyst composition may be used singly or in combination of two or more. In place of the metal complex, its precursor may be used singly or in a physical mixture thereof. If necessary, the component (a) of the catalyst composition may be incorporated with a ligand such as alkyl phosphine, aromatic phosphine, phosphorous ester, and phosphoric ester, or a nitrile ligand such as acetonitrile, as long as the reaction is not adversely affected. These metal complexes may be bonded to the carrier at a desired position through $R^a$.

In the catalyst composition to be used for producing the prepolymer, it is not necessary to use the component (b) if the component (a), the component (c) or the carrier perform the function of the component (b). If needed, however, the component (b) represented by "b" in the formula (III) is, in addition to the component (a) and the component (c), bonded to the carrier in a suitable amount. As the component (b), usable is at least one compound having redox catalytic ability, which is selected from the group consisting of lanthanoid compounds, compounds of group 5, group 6 or group 7 transition metals of the periodic table, iron compounds, cobalt compounds, nickel compounds, and copper compounds. These compounds may be in the form of organic complex, organic salt or inorganic salt. Specific examples thereof include cerium compounds, vanadium compounds, chromium compounds, manganese compounds, iron compounds, cobalt compounds, and copper compounds, with cerium compounds and manganese compounds being preferable. The redox catalysts for the component (b) of the catalyst composition may be used singly or in combination of two or more. Alternatively, precursors for the redox catalysts may be used singly or in a physical mixture thereof. These compounds are bonded to the carrier at a desired position through $R^b$.

In the catalyst composition to be used for producing the prepolymer, it is not necessary to use the component (c) if the component (a), the component (b) or the carrier performs the function of the component (c). If needed, however, the component (c) represented by "c" in the formula (III) is, in addition to the component (a) and the component (b), bonded to the carrier in a suitable amount. As the component (c), a compound capable of activating the aromatic hydroxy compound is preferably used. More preferred are onium halide compounds, metal compounds having Lewis acidity, basic catalyst compounds and the like.

Examples of onium halide compounds include the compounds represented by the following formula (IV):

$$R^1R^2R\ R^4AB \tag{IV}$$

wherein, A represents a nitrogen atom or a phosphorous atom; B represents a halogen atom such as fluorine, chlorine, bromine, and iodide, a hydroxyl group, an alkoxy group or an aryl group; $R^1$ to $R^4$ may be the same or different and are each represents an alkyl group having from 1 to 8 carbon atoms or an aryl group having from 6 to 12 carbon atoms, for example, methyl group, ethyl group, propyl group, butyl group, pentyl group, hexyl group, octyl group, cyclohexyl group, phenyl group, tolyl group, xylyl group, or naphthyl group, with the proviso that $R^1$ together with $R^2$ or $R^3$ together with $R^4$ may represent a bivalent group represented by —$(CH_2)_n$— wherein n is an integer of from 2 to 7.

In addition, bis(triphenylphosphoranylidene)ammonium halides outside the scope of the formula (IV) may be also usable as the onium halide compound. Examples of the onium halide compounds include tetra-n-butylammonium bromide, tetraphenylphosphonium bromide, bis(triphenylphosphoranylidene)ammonium bromide, bis(triphenylphosphoranylidene)ammonium hydroxide, and bis(triphenylphosphoranylidene)ammonium phenoxide. These compounds may be bonded to the carrier at desired position through $R^c$.

In the catalyst composition to be used for producing the prepolymer, $R^a$ through $R^c$ in the formula (III) for bonding the components (a) to (c) to the carrier may be any substituent as long as the reaction is not adversely affected. Examples thereof include a single bond, a double bond, a triple bond (these bonds are each assumed as a substituent having a carbon number of zero), a bifunctional saturated or unsaturated hydrocarbon group having from 1 to 20 carbon atoms, a bifunctional aromatic hydrocarbon group having from 6 to 20 carbon atoms (these hydrocarbon groups may contain a heteroatom, a metal atom and the like), or a bi-, tri- or tetrafunctional substituent selected from the group consisting of ester bond, ether bond, thioester bond, thioether bond, amino bond, urea bond, amide bond, imide bond, and substituents derived from combinations of the preceding bonds. These bifunctional substituents, trifunctional substituents and tetrafunctional substituents may contain a substituent as long as the reaction is not adversely affected.

Examples of the carriers, corresponding to the series of S in the formula (III), for the catalyst composition for producing the prepolymer, include any compounds composed of one or more atoms of one or more kinds, which are selected from the group consisting of carbon, boron, nitrogen, oxygen, phosphorous, silicon, sulfur, aluminum, zirconium, and titanium, as long as the reaction is not adversely affected. Plural groups of at least one kind of $R^a$, $R^b$ and $R^c$ may be bonded to the same S of the formula (III) radially or sequentially. Preferred examples of the carriers include organic carriers such as organic polymers, dendrimers, fullerenes, carbon nanotubes, saccharides, and biomacromolecules, and inorganic carriers such as zeolites, silica, alumina, zirconia, titania, metal carbonates, metal sulfates, and metal oxides. More preferred are polystyrenes such as p-metylpolystyrene and polystyrene, p-metylstyrene-divinylbenzene copolymer, styrene-divinylbenzene copolymer, polyvinylpyrrolidone, polypiridines, polyesters, polyvinylalcohol, polyvinyl lacetate, silica, smectite, kaolinite, montmorillonite, bentonite, vermiculite, hydrotalcite, and hydroapatite.

In addition to the component (a), the component (b), the component (c), the components for bonding the components (a) to (c) to the carrier, and the carrier, the catalyst composition for producing the prepolymer may further contain, if necessary, an additive for improving properties of each component or the carrier, as long as the reaction is not adversely affected. Such an additive may include organic binders, inorganic binders, cross-linking agents, modifiers and the like. The catalyst composition may be in any shape as long as the reaction is not adversely affected, and the catalyst composition is made into powder, shaped articles such as pellet, honeycomb and plate, etc. according to the type of reaction. Alternatively, the catalyst composition is in a physical mixture of each precursor for the catalyst, for example, the metal complex, the compound, the carrier and the additive.

Particularly preferred examples of the catalyst composition for the production of prepolymer include (1) a catalyst composition composed of a p-metylstyrene-divinylbenzene copolymer to which a metal complex composed of a palladium compound and a compound having a pyridine ring structure or a metal complex composed of a palladium compound and a compound having a bipyridine ring structure, and pyridinium chloride are respectively bonded, (2) a catalyst composition composed of a palladium compound and a triphenylphosphine-bonded styrene-divinylbenzene copolymer, and (3) a catalyst composition composed of a palladium compound, a compound having redox catalyst capability and polyvinylpyrrolidone.

In the processes of producing the prepolymer, the catalyst is used in an amount commonly employed in the art, although not specifically limited thereto. For example, the amount of the component (a) to be used is from $1\times10^{-8}$ to 0.5 mol, preferably from $1\times10^{-6}$ to 0.1 mol in terms of palladium per one mole of the aromatic hydroxy compound. If less than $1\times10^{-8}$ mol, the reaction rate is impractically slow in some cases. An amount exceeding 0.5 mol is less economical because no additional effect is obtained. The amount of the component (b) to be used is from 0.1 to 100 mol, preferably from 0.5 to 50 mol per one mole of palladium in the component (a). If less than 0.1 mol, the reaction rate is impractically slow in some cases. An amount exceeding 100 mol is economically disadvantageous because the oxidative decomposition of the produced aromatic ester by the component (b) proceeds. The amount of the component (c) to be used is from 0.1 to 1000 mol, preferably from 0.5 to 500 mol per one mole of palladium in the component (a). If less than 0.1 mol, the reaction rate is impractically slow in some cases. An amount exceeding 1000 mol is economically disadvantageous because the side reaction responsible for the component (c) occurs. The amounts of the other catalyst components such as the carrier are not determined independently, because they depend on the amounts of the components bonded to the carrier.

One or two of the component (a), the component (b) and the component (c) may be omitted from the catalyst components. If omitted and the catalyst function of the omitted component is needed, the omitted component may be used separately from the catalyst. The component (a), the component (b) or the component (c) to be used for such purpose may be either bonded or not bonded to a carrier.

A-3) Reaction Conditions for Producing Prepolymer

In the present invention, the oxidative carbonylation for the production of prepolymer proceeds either in the absence or presence of a solvent. Although the solventless reaction is generally economically advantageous, the reaction may be carried out in a solvent if it is needed in the processes of producing polycarbonates. Usable solvents are, for example, aliphatic hydrocarbons, alicyclic hydrocarbons, aromatic hydrocarbons, halogenated hydrocarbons, ethers, esters, nitrogen-containing solvents, and sulfur-containing solvents, and suitably selected according to the kind of catalyst to be used and the combination of catalysts to be used.

The reaction temperature for the production of prepolymer by the oxidative carbonylation is from 30 to 180° C., preferably from 50 to 150° C., and more preferably from 80 to 120° C. If higher than the above range, side reactions such as decomposition becomes noticeable, and if lower than the above range the reaction rate becomes lower, thus each being less practical. Since the gaseous starting materials such as carbon monoxide and oxygen are used, the reaction is generally carried out under pressure. The partial pressure of carbon monoxide is from $1\times10^{-2}$ to 20 MPa, preferably from $1\times10^{-2}$ to 10 MPa. The partial pressure of oxygen is from $1\times10^{-2}$ to 10 MPa, preferably from $1\times10^{-2}$ to 5 MPa. It is particularly preferred to control the partial pressure of oxygen so as to keep the composition of gases in the reaction system outside the explosion range. If the reaction pressure is too low, the reaction rate decreases. Excessively high pressure is economically disadvantageous because a large size of reaction apparatus is required to increase construction costs. The partial pressures of inert gas, hydrogen, etc., if used, are not limited specifically, and suitably set within a practical pressure range. The reaction time is preferably from 1 to 48 h in case of a batch-wise reaction. A reaction time of one hour or more is sufficient for obtaining good yields and a reaction time of 48 h or less is little economical disadvantage. In view of the above, the reaction time is preferably from 2 to 36 h, more preferably from 3 to 24 h.

The production of prepolymer may be conducted by any of a batch-wise manner, a semi-continuous manner where the starting materials, the catalyst, etc. are continuously fed, and a continuous manner where the starting materials, the catalyst, etc. are continuously fed and the reaction products are continuously discharged.

(A-4) Physical Properties of Prepolymer

The polycarbonate prepolymer for solid state polymerization of the present invention is produced by an oxidative carbonylation reaction of the aromatic dihydroxy compound, the monohydric phenol having a boiling point of 330° C. or below, carbon monoxide and oxygen, and is characterized by that (a) the ratio of aryl carbonate groups and hydroxy groups each constituting the terminal groups is from 2:8 to 8:2, and (b) the molecular weight distribution (Mw/Mn) is from 1.1 to 2.1.

If the boiling point of the monohydric phenol is more than 330° C., the increase of the molecular weight by the solid state polymerization is difficult within a short period of time.

The ratio of aryl carbonate groups to hydroxy groups each constituting the terminal groups of the polycarbonate prepolymer for solid state polymerization is from 2:8 to 8:2, preferably from 3:7 to 7:3. If outside the above range, namely, the proportion of aryl carbonate groups in the terminal groups is excessively large or the proportion of hydroxy groups in the terminal groups is excessively large, the solid state polymerization does not proceeds sufficiently to make the production of products with increased molecular weight difficult.

It is difficult to produce a polycarbonate prepolymer for solid state polymerization having a molecular weight distribution (Mw/Mn) of less than 1.1, and there is no advantage in so trying. If the molecular weight distribution is more than 2.1, solid state-polymerized polymer fails to have a sufficiently large molecular weight and the molecular weight distribution thereof becomes broader.

The number average molecular weight (Mn) of the polycarbonate prepolymer for solid state polymerization is preferably from 1000 to 10000, more preferably from 1500 to 8000. If less than 1000, the solid state polymerization is likely to become impossible because the prepolymer melts. If more than 10000, the productivity is remarkably reduced because of difficulty of the prepolymer polymerization.

(B) Production Processes of Polycarbonate

In the production process of polycarbonate of the present invention, the prepolymer produced is crystallized and then polymerized in swelled condition or solid condition.

An antioxidant may be, if desired, added to the prepolymer produced in the manner described above, and also, to the polycarbonate obtained after the polymerization. The polymerization is preferably conducted in the presence of a quaternary phosphonium salt as a catalyst.

(B-1) Antioxidants

The antioxidant which is optionally added to the prepolymer is preferably an antioxidant based on phosphoric acid or its related compounds, such as trialkyl phosphite, tricycloalkyl phosphite, triaryl phosphite, monoalkyldiaryl phosphite, trialkyl phosphate, tricycloalkyl phosphate, and triaryl phosphate.

(B-2) Catalysts

The quaternary phosphonium salt to be used in the polymerization of prepolymer in swelled condition or solid condition is not specifically limited and include various compounds. For example, the compounds represented by the following formula (IX) or (X):

(IX)

(X)

are mentioned.

In the formula (IX) or (X), $R^{12}$ represents an organic group, for example, an alkyl group or a cycloalkyl group such as methyl group, ethyl group, propyl group, butyl group, pentyl group, hexyl group, octyl group, and cyclohexyl group; an aryl group such as phenyl group, tolyl group, naphthyl group, and biphenyl group; or an arylalkyl group such as benzyl group. Four $R^{12}$ groups may be the same or different, and two thereof may be bonded to each other to form a ring structure. $X^2$ represents a monovalent anion-forming group such as halogen atom, hydroxyl group, alkoxy group, aryloxy group, R'COO, $HCO_3$, $(R'O)_2P(=O)O$ and $BR''_4$, wherein R' represents a hydrocarbon group such as alkyl group and aryl group, two R'O groups may be the same or different, R" represents hydrogen atom or a hydrocarbon group such as alkyl group and aryl group, and four R" groups may be the same or different. $Y^1$ represents a bivalent anion-forming group such as $CO_3$.

Examples of the quaternary phosphonium salts include tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, and tetrabutylphosphonium hydroxide. Other examples thereof include tetramethylphosphonium tetraphenylborate, tetraphenylphosphonium bromide, tetraphenylphosphonium phenolate, tetraphenylphosphonium tetraphenylborate, methyltriphenylphosphonium tetraphenylborate, benzyltriphenylphosphonium tetraphenylborate biphenyltriphenylphosphonium tetraphenylborate, tetratolylphosphonium tetraphenylborates, tetraphenylphosphonium phenolate, tetra(p-t-butylphenyl)phosphonium diphenylphenolate, triphenylbutylphosphonium phenolate, and triphenylbutylphosphonium tetraphenylborate.

Preferred are quaternary phosphonium salts having alkyl group such as tetramethylphosphonium metyltriphenylborate, tetraethylphosphonium ethyltriphenylborate, tetrapropylphosphonium propyltriphenylborate, tetrabutylphosphonium butyltriphenylborate, tetrabutylphosphonium tetraphenylborate, tetraethylphosphonium tetraphenylborate, trimethylethylphosphonium trimethlphenylborate, and trimethylbenzylphosphonium benzyltriphenylborate, because they have a high catalytic activity and hardly remain in the polymers produced because of their easy thermal decomposability.

More preferred are tetraalkylphosphonium salts such as tetramethylphosphonium hydroxide, tetraethylphosphonium hydroxide and tetrabutylphosphonium hydroxide, because they have low thermal decomposition temperatures and easily decomposed, to avoid the contamination of end polycarbonates with impurities. In addition, these salts are advantageous in production costs because the number of constitutional carbon atoms is small to reduce the unit of utilities in the production of polycarbonate.

In addition to the compounds of the formula (IX) and (X), also employable are, for example, bis-tetraphenylphosphonium salt of 2,2-bis(4-hydroxyphenyl)propane, ethylenebis (triphenylphosphonium) dibromide, and trimethylenebis (triphenylphosphonium) bis(tetraphenylborate).

Further, quaternary phosphonium salts having an aryl group and/or a branched alkyl group represented by the following formula (XI) or (XII):

(XI)

(XII)

are also usable.

In the formula (XI) or (XII), n represents an integer of from 1 to 4.

$R^{13}$ represents at least one group selected from the group consisting of aryl groups and branched alkyl groups. The branched alkyl group has a structure of $R_3C$—, wherein R represents at least one group selected from the group consisting of hydrogen, alkyl groups, substituted alkyl groups, aryl groups and substituted aryl groups, and two of three R groups may be bonded to form a ring structure, excepting that two of R groups are hydrogen. Examples thereof include a branched alkyl group such as cycloalkyl group, isopropyl group, and tert-butyl group, and an arylalkyl group such as benzyl group. When n is 2 or more, plural R groups may be the same or different.

$R^{14}$ represents an alkyl group, a substituted alkyl group, an aryl group, or a substituted aryl group.

$X^2$ represents a monovalent anion-forming group such as a halogen atom, a hydroxyl group, an alkoxy group, an aryloxy group, R' COO, $HCO_3$, $(R'O)_2P(=O)O$ or $BR''_4$. R' represents a hydrocarbon group such as an alkyl group and an aryl group, provided that two R'O groups may be the same or different. R'' represents a hydrogen atom or a hydrocarbon group such as an alkyl group and an aryl group, provided that four R'' groups may be the same or different.

$Y^1$ represents a divalent anion-forming group such as $CO_3$.

Examples of such quaternary phosphonium salts include tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, and tetrahexylphosphonium hydroxide; mono(aryl or alkyl)triphenylphosphonium hydroxides such as methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyl triphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphthyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, and naphthylphenyltriphenylphosphonium hydroxide; mono(aryl) trialkylphosphonium hydroxides such as phenyltrimethylphosphonium hydroxide, biphenyltrimethylphosphonium hydroxide, phenyltrihexylphosphonium hydroxide, and biphenyltrihexylphosphonium hydroxide; diaryldialkylphosphonium hydroxides such as dimethyldiphenylphosphonium hydroxide, diethyldiphenylphosphonium hydroxide, and di(biphenyl)diphenylphosphonium hydroxide; tetraarylphosphonium tetraphenylborates such as tetraphenylphosphonium tetraphenylborate, tetranaphtylphosphonium tetraphenylborate, tetra(chlorophenyl)phosphonium tetraphenylborate, tetra(biphenyl)phosphonium tetraphenylborate, and tetratolylphosphonium tetraphenylborate; mono(aryl or alkyl)triphenylphosphonium tetraphenylborates such as methyltriphenylphosphonium tetraphenylborate, ethyltriphenylphosphonium tetraphenylborate, propyltriphenylphosphonium tetraphenylborate, butyltriphenylphosphonium tetraphenylborate, octyltriphenylphosphonium tetraphenylborate, tetradecyltriphenylphosphonium tetraphenylborate, benzyltriphenylphosphonium tetraphenylborate, ethoxybenzyltriphenylphosphonium tetraphenylborate, methoxymethyl triphenylphosphonium tetraphenylborate, acetoxymethyltriphenylphosphonium tetraphenylborate, phenacyltriphenylphosphonium tetraphenylborate, chloromethyltriphenylphosphonium tetraphenylborate, bromomethyltriphenylphosphonium tetraphenylborate, biphenyltriphenylphosphonium tetraphenylborate, naphthyltriphenylphosphonium tetraphenylborate, chlorophenyltriphenylphosphonium tetraphenylborate, phenoxyphenyltriphenylphosphonium tetraphenylborate, and acetoxyphenyltriphenylphosphonium tetraphenylborate, naphthylphenyltriphenylphosphonium tetraphenylborate; monoaryltrialkylphosphonium tetraphenylborates such as phenyltrimethylphosphonium tetraphenylborate, biphenyltrimethylphosphonium tetraphenylborate, phenyltrihexylphosphonium tetraphenylborate, and biphenyltrihexylphosphonium tetraphenylborate; and diaryldialkylphosphonium tetraphenylborates such as dimethyldiphenylphosphonium tetraphenylborate, diethyldiphenylphosphonium tetraphenylborate, and di(biphenyl)diphenylphosphonium tetraphenylborate.

The counter anions such as hydroxide and tetraphenylborate of the quaternary phosphonium salts recited above may be replaced by an aryloxy group such as phenoxide, an alkoxyl group such as methoxide and ethoxide, an alkylcarbonyloxy group such as acetate, an arylcarbonyloxy group such as benzoate, or a halogen atom such as chloride and bromide.

In addition to the compounds of the formula (XI), the compounds of the formula (XII) having a divalent counter anion are also usable. Examples thereof include quaternary phosphonium salts such as bis(tetraphenylphosphonium) carbonate and bis(biphenyltriphenylphosphonium) carbonate, bis-tetraphenylphosphonium salt of 2,2-bis(4-hydroxyphenyl)propane, ethylenebis(triphenylphosphonium) dibromide, and trimethylenebis(triphenylphosphonium) bis(tetraphenylborate).

Further employable are compounds of the formula (XIII) or (XIV):

 (XIII)

 (XIV)

In the formula (XIII) or (XIV), n represents an integer of from 1 to 4; $R^{15}$ may be the same or different and represents an organic group; $X^3$ represents a halogen atom, a hydroxyl group, an alkoxy group, an aryloxy group, an alkylcarbonyloxy group, an arylcarbonyloxy group, $HCO_3$, or $BR_4$ (wherein R represents a hydrogen atom or a hydrocarbon group, and four R groups may be the same or different); Ph represents a phenyl group; and $Y^2$ represents $CO_3$.

Examples of such quaternary phosphonium salts include tetraphenylphosphonium hydroxide, biphenyltriphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenylborate, cyclohexyltriphenylphosphonium tetraphenylborate biphenyltriphenylphosphonium tetraphenylborate, methoxyphenyltriphenylphosphonium tetraphenylborate, phenoxyphenyltriphenylphosphonium tetraphenylborate, naphthylphenyltriphenylphosphonium tetraphenylborate, tetraphenylphosphonium phenoxide, biphenyltriphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, biphenyltriphenylphosphonium chloride, methoxyphenyltriphenylphosphonium chloride, phenoxyphenyltriphenylphosphonium chloride, and naphthylphenyltriphenylphosphonium chloride, with cyclohexyltriphenylphosphonium tetraphenylborate being preferably used in view of the balance between the catalyst efficacy and the quality of polycarbonates to be produced.

Examples of the quaternary phosphonium salts having a branched alkyl group include isopropyltrimethylphopshonium, isopropyltriethylphosphonium, isopropyltributylphosphonium, isopropyltriphenylphosphonium, tetraisopropylphosphonium, cyclohexyltriethylphosphonium, cyclohexyltrimethylphosphonium, cyclohexyltributylphosphonium, cyclohexyltriphenylphosphonium, tetracyclohexylphosphonium, 1,1,1-triphenylmethyltrimethylphosphonium, 1,1,1-triphenylmethyltriethylphosphonium, 1,1,1-triphenylmethyltributylphosphonium, and 1,1,1-triphenylmethyltriphenylphosphonium.

Examples of the counter anion $X^3$ include hydroxide, borohydride, tetraphenylborate, acetate, propionate, fluoride, chloride, and hydrocarbonate. Example of $Y^2$ is carbonate. Examples of salts composed of the quaternary phosphonium having a branched alkyl group (cation) and $X^3$ or $Y^2$ (anion) include various combinations of specific examples of cations and anions mentioned above, and specifically, isopropyltrimethylphosphonium hydroxide, cyclohexyltriphenylphosphonium chloride, 1,1,1-triphenylmethyltriethylphosphonium acetate, and bis(isopropyltriethylphosphonium) carbonate.

Among those quaternary phosphonium salts having a branched alkyl group, particularly preferred are cyclohexyltriphenylphosphonium tetraphenylborate and cyclopentyltriphenylphosphonium tetraphenylborate because the catalyst efficacy and the quality of polycarbonates to be produced are well balanced. Additional examples of the quaternary phosphonium salts having a branched alkyl group includes carboxylates such as tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, and tetrapropylphosphonium butyrate.

The content of metal impurities in the quaternary phosphonium salts is preferably as low as possible. Particularly, the content of alkali metal compounds and alkaline earth metal compounds is preferably 50 ppm or lower. The quaternary phosphonium salt is used preferably in an amount of from $10^{-2}$ to $10^{-8}$ mol per one mole of the starting dihydroxy compound. If less than $10^{-8}$ mol, the catalyst activity at a later reaction stage is insufficient, and if more than $10^{-2}$ mol, the production cost will increase undesirably.

(B-3) Polymerization Process of Prepolymer (1) Crystallization of Prepolymer

As aforementioned, the prepolymer is crystallized before the polymerization in swelling condition or solid condition. The crystallization is performed preferably by a solvent treating method or a heat-crystallization method, but not limited thereto. In the solvent treating method, the prepolymer is crystallized in a solvent such as chloromethane, methylene chloride, chloroform, acetophenone, tetrahydrofuran, γ-butyrolactone, cyclohexane, and propylene carbonate. Although depending upon the conditions, the amount of the solvent is preferably from 0.05 to 100 times, more preferably from 0.1 to 50 times the weight of the prepolymer. In the heat-crystallization method, the prepolymer is crystallized by heating at temperatures not lower than the glass transition temperature of the objective aromatic polycarbonate but lower than the melt starting temperature of the prepolymer.

The flaking process is performed by a method suitably selected from conventionally known methods such as a tumbling granulation, an extrusion granulation, a compression granulation, a melt granulation, a spray drying granulation, a fluidized bed granulation, a crush granulation, an agitation granulation, a liquid phase granulation, and a vacuum freeze granulation. The shape of flakes is preferably, without limitation, pellet, bead, etc. in view of easy handling. Also effective is a mixing granulation method where the prepolymer is first dissolved in a swelling solvent which is also used in the next step, and then the prepolymer is made into flakes by adding a poor solvent to polycarbonate under stirring. The drying of flakes before the polymerization is not required.

(2) Solid State Polymerization

The crystallized solid prepolymer is polymerized by using the quaternary phosphonium salt as the catalyst. The polymerization is promoted by removing the by-produced aromatic monohydroxy compounds and/or diaryl carbonates from the reaction system. The removal is effected preferably by carrying the by-products out of the reaction system together with an inert gas such as nitrogen, argon, helium, and carbon dioxide, a hydrocarbon gas, or a poor solvent vapor which is introduced into the reaction system, and/or by performing the polymerization under reduced pressure. The carrier gas is introduced into the reaction system preferably after heated to around the reaction temperature.

The poor solvent is preferably a straight-chain or branched-chain saturated hydrocarbon having from 4 to 18 carbon atoms or a low-degree unsaturated hydrocarbon having from 4 to 18 carbon atom, which allows polycarbonate to dissolve therein up to 0.1% by weight and which is inert to the reaction. A boiling point exceeding 250° C. is not preferred because the removal of the residual solvents becomes difficult to reduce the quality of the products. The crystallized prepolymer for solid state polymerization is preferably in the form of pellets and beads, although not limited thereto.

The catalyst for the solid state polymerization is preferably the quaternary phosphonium salt, and if desired, another catalyst may be combinedly used. The catalyst remaining after the prepolymer production may be used without removal, or the catalyst may be freshly added in the form of powder, liquid or gas. The reaction temperature Tp (° C.) and the reaction time of the solid state polymerization vary depending upon the kind (chemical structure, molecular weight, etc) and shape of the crystallized prepolymer, the kind and amount of the catalyst remaining in the crystallized prepolymer, the kind and amount of the catalyst supplemented if needed, the crystallization degree and melting temperature Tm' (° C.) of the crystallized prepolymer, the required polymerization degree of the objective aromatic polycarbonate, and other reaction conditions. The solid state polymerization is carried out preferably at a temperature which is not lower than the glass transition temperature of the objective aromatic polycarbonate and allows the crystallized prepolymer to keep its solid state without melting during the solid state polymerization, more preferably in a temperature range represented by the following formula (XV):

$$Tm'-50 \leq Tp < Tm' \quad (XV)$$

for from one minute to 100 h, preferably from 0.1 to 50 h.

In the production of a bisphenol A polycarbonate, for example, the temperature range is preferably from about 150 to about 260° C., more preferably from about 180 to about 245° C. To heat the polymer being polymerized uniformly and remove the by-products efficiently, it is preferred to flow the reaction mixture by stirring it, rotating the reactor or blowing a heated gas.

Industrially useful aromatic polycarbonates have weight average molecular weights generally in the rang of from about 6000 to about 200000. By the solid state polymerization described above, polycarbonate having such a polymerization degree is easily produced. Since the crystallinity of the aromatic polycarbonate produced by the solid state polymerization of the crystallized prepolymer is larger than that of the prepolymer before polymerization, powders of the crystalline aromatic polycarbonate are obtained by the method of the present invention. The powdery crystalline aromatic polycarbonate may be directly made into pellets from an extruder without cooling, or directly made into shaped articles by a molding machine without cooling. The ratio between the pre-polymerization and the solid state polymerization contributing to the polymerization may be varied as desired.

(3) Swelled Solid State Polymerization

This polymerization process is a method of further polymerizing the crystallized prepolymer obtained in the manner described above by the solid state polymerization in a swelled condition attained by a swelling gas mentioned below. In the production of polycarbonate by transesterification including the removal of the by-produced low molecular compounds such as phenol by exhaustion or extraction, the reaction can be made more efficiently by removing the low molecular compound from the polymer (oligocarbonate) in a condition swelled by the swelling gas rather in a highly viscous molten condition or a crystallized solid condition, because the rate of mass transfer is accelerated. This polymerization process is based on this fact.

The swelling solvent may be a single swelling solvent capable of swelling polycarbonate under the reaction conditions mentioned below, a mixture thereof, or a mixture of one or more swelling solvents and one or more poor solvents to polycarbonate.

The swelled condition means a state of the starting prepolymer flake increased in its volume more than when thermally expanded or increased in its weight. The swelling solvent means a single compound or a mixture of compounds which is completely vaporized by boiling or exhibits a vapor pressure of 50 mmHg or more under the following reaction conditions, and which is capable of forming the above swelled state.

The kind of swelling solvent is not particularly limited as long as the above requirements are satisfied. For example, aromatic compounds and oxygen-containing compounds having a solubility parameter of from 4 to 20 $(cal/cm^3)^{1/2}$, preferably from 7 to 14 $(cal/cm^3)$ 1/2 are usable as the swelling solvent. Specific examples of the swelling solvents include aromatic hydrocarbons such as benzene, toluene, xylene, ethylbenzene, diethylbenzene, propylbenzene, and dipropylbenzene; and ethers such as tetrahydrofuran and dioxane; and ketones such as methyl ethyl ketone and methyl isobutyl ketone, with the aromatic hydrocarbon having from 6 to 20 carbon atoms, either singly or mixture thereof, being preferred.

The poor solvent to be mixed with the swelling solvent is preferably a straight-chain or branched-chain saturated hydrocarbon having from 4 to 18 carbon atoms or a low-degree unsaturated hydrocarbon having from 4 to 18 carbon atoms, which allows polycarbonate to dissolve up to 0.1% by weight under the following reaction conditions and is inert to the reaction. It is not preferred that the boiling points of the swelling solvent and the poor solvent are both more than 250° C., because the removal of solvent residues may become difficult to reduce the quality of products.

In case of mixing the poor solvent to the swelling solvent, the content of the swelling solvent in the mixture is 1% by weight or more, preferably 5% by weight or more. In the swelled solid state polymerization, the reaction temperature is preferably from 100 to 240° C., and the reaction pressure is preferably from 10 Torr to 5 $kg/cm^2G$, more preferably atmospheric pressure. If the reaction temperature is lower than the above range, the transesterification does not proceed. In high temperature conditions exceeding the melting point of the prepolymer, the solid phase cannot be kept to cause particles to fuse-bond to each other and significantly reduce the operating efficiency. Therefore, the reaction temperature should be set at the melting point or lower.

The catalyst for the swelled solid state polymerization is preferably the quaternary phosphonium salts, and if desired, another catalyst may be combinedly used. The catalyst remaining after the prepolymer production may be used without removal, or the catalyst may be freshly added in the form of powder, liquid or gas. The swelling solvent is fed into the reactor in a liquid state and then vaporized therein, or alternatively, fed into the reactor after vaporized in advance by a heat exchanger. The feeding rate of gas into the reactor is preferably 0.5 L/h (normal condition) or more per one gram of the prepolymer. Since the gas of swelling solvent has an effect of removing phenol and functions as a heating medium, the feeding rate thereof closely relates to the reaction rate. Therefore, the reaction rate increases with increasing feeding rate of gas. The reactor for the swelled solid state polymerization is not specified particularly.

The present invention will be described in more detail with reference to the following examples and comparative examples which, however, are not intended to restrict the scope of the present invention thereto. The catalysts and the reagents used below are commercial products or prepared according to methods described in literatures.

In the following examples and comparative examples, the number average molecular weight (Mn), the weight average molecular weight (Mw) and the molecular weight distribution (Mw/Mn) were measured by using GPC apparatus.

Eluent: chloroform

Column: Shodex K-804L

Calibration curve: prepared on 5 standard polyethylenes each having a molecular weight of 1050, 5870, 17100, 98900 or 355000.

Detector: ultraviolet (UV) detector

The ratio (PTBP/OH) between aryl carbonate groups (PTBP) and hydroxy groups (OH) constituting the terminal groups was measured by using NMR apparatus.

Apparatus: 600 MHz, JIM-LA6000FT (manufactured by JEOL, Ltd)

Solvent: heavy chloroform

Measuring temperature: room temperature

EXAMPLE 1

A mixture of 0.500 g of triphenylphosphine-modified styrene-divinylbenzene copolymer (content of triphenylphosphine unit: 0.25 meq/g) and 10 mL of toluene was stirred at room temperature for one hour in a nitrogen atmosphere. After adding a solution of 0.576 g (1.50 mmol) of dichlorobis (benzonitrile)palladium in 30 mL of toluene, the suspension was further stirred for 24 h at room temperature in a nitrogen atmosphere. Then, the brown solids produced were collected by filtration, washed with toluene and dried under reduced pressure, to obtain 0.531 g of a catalyst composition Pd—PPh$_2$-PS. The content in the catalyst composition was 0.29 mmol/g for palladium and 0.22 mmol/g for phosphorous when determined by elementary analysis.

Into a 30-mL autoclave, were hermetically charged 41.6 mg (12 μmol in terms of Pd) of the catalyst composition Pd—PPh$_2$—PS, 0.95 g (4.16 mmol) of bisphenol A (BPA), 0.158 g (1.05 mmol) of PTBP, 0.0676 g (0.625 mmol) of benzoquinone, 14.5 mg (24 μmol) of manganese tri(2,2,6,6-tetramethyl-3,5-heptanedioate), 0.15 g (0.24 mmol) of bis(triphenylphosphoranylidene) ammonium bromide, 1 g of synthetic zeolite A-3 powder (manufactured by Wako Pure Chemical Industries, Ltd.; particle size: less than 75 μm) and 10 mL of methylene chloride. The inner atmosphere of the autoclave was replaced with carbon monoxide by introducing and evacuating carbon monoxide. Then, the inner pressure was raised to 6.0 MPa by introducing carbon monoxide, and air was further introduced to raise the total inner pressure to 6.3 MPa, each pressure being the value at 25° C. The contents of the autoclave was heated to 100° C. to allow the reaction to proceed for 24 h. After cooling and releasing the pressure, 20 mL of methylene chloride was added to the reaction product to obtain a dark brown suspension. By filtering the suspension, the catalyst composition was easily separated, to obtain a uniform dark brown liquid. By adding 0.028 mg (1.0×10$^{-5}$ mol/mol of BPA) of cyclohexylphosphonium tetraphenylborate as a catalyst for solid state polymerization into the solution and removing the solvent, a prepolymer for solid state polymerization was obtained. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the prepolymer, are shown in Table 1.

Into a SUS tube having a diameter of 58 mm and a length of 170 mm, was charged 500 mg of the powdery prepolymer obtained above. Then, the solid state polymerization was performed at from room temperature to 190° C. for 2 h, at 210° C. for 2 h, and then at 230° C. for 4 h while flowing nitrogen gas at a rate of 100 mL/min, to obtain a polycarbonate. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the polycarbonate, are shown in Table 1.

EXAMPLE 2

Except for using 0.269 g (1.79 mmol) of PTBP, the procedure of Example 1 was repeated. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the prepolymer for solid state polymerization and the polycarbonate, are shown in Table 1.

EXAMPLE 3

Except for using 0.42 g (2.80 mmol) of PTBP, the procedure of Example 1 was repeated. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the prepolymer for solid state polymerization and the polycarbonate, are shown in Table 1.

EXAMPLE 4

Except for using 0.033 g (0.22 mmol) of PTBP, the procedure of Example 1 was repeated. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the prepolymer for solid state polymerization and the polycarbonate, are shown in Table 1.

EXAMPLE 5

By using hydrotalcite ("Kyoward 1000" manufactured by Kyowa Chemical Industry Co., Ltd.) as an inorganic carrier, a catalyst was produced. Into a suspension of 370 g of Kyoward 1000 in 20 mL of acetone, a solution of 0.5 mmol of dichlorobis(benzonitrile)palladium (II) in 30 mL of acetone was slowly added, and the mixture was stirred for one hour at room temperature. Thereafter, a solution of 1.0 mmol cobalt (II) chloride in 30 mL of acetone was slowly added, and the mixture was stirred for 24 h at room temperature. The precipitated matter was collected by filtration, washed with acetone, and vacuum-dried at 100° C. for 24 h, to prepare a supported catalyst.

Into a 50-mL autoclave, 6.3 mmol of BPA, 2.7 mmol of PTBP, 59 mg of the supported catalyst prepared above, 0.94 mmol of tetrabutylammonium bromide, 0.47 mmol of benzoquinone, 1.5 g of powdery synthetic zeolite A-3 (manufactured by Wako Pure Chemical Industries, Ltd.; particle size: less than 75 μm) and 15 ml of propylene carbonate were charged. Then the autoclave was filled with carbon monoxide of 6.0 MPa and oxygen of 0.3 MPa at 25° C., hermetically closed, and heated at 100° C. for 24 h. After the reaction was over, the synthetic zeolite and the supported catalyst were removed and the resultant product was reprecipitated from methanol to obtain a polycarbonate prepolymer, which was then vacuum-dried at 100° C. for 24 h.

A mixture of 500 mg of the polycarbonate prepolymer and 300 ppm of cyclohexyltriphenylphosphonium tetraphenylborate was put into a SUS tube having an inner diameter of 1.3 cm. The solid state polymerization was carried out for 8 h in total, i.e., at 190° C. for 2 h, at 210° C. for 2 h, and at 230° C. for 4 h, while flowing nitrogen gas at a rate of 100 mL/min, to produce a polycarbonate. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the prepolymer for solid state polymerization and the polycarbonate, are shown in Table 1.

COMPARATIVE EXAMPLE 1

Except for omitting the use of PTBP, the procedure of Example 1 was repeated. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the prepolymer for solid state polymerization and the polycarbonate, are shown in Table 1.

COMPARATIVE EXAMPLE 2

Except for using 0.38 g (1.79 mmol) of p-cumylphenol in place of PTBP, the procedure of the Example 1 was repeated. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the prepolymer for solid state polymerization and the polycarbonate, are shown in Table 1.

COMPARATIVE EXAMPLE 3

(Production of Polycarbonate Oligomer A by Interfacial Polycondensation)

Into 400 L of a 5 wt % sodium hydroxide aqueous solution, 60 kg of BPA was dissolved. Into a tubular reactor having an inner diameter of 10 mm and a length of 10 m, the BPA solution in sodium hydroxide aqueous solution kept at room temperature and methylene chloride were introduced respectively at flow rates of 138 L/h and 69 L/h through an orifice disc. Then, phosgene was introduced in parallel at a flow rate of 10.7 kg/h to allow the reaction to continue for 3 h. The tubular reactor used was a double-walled type, and the temperature of discharged reaction solution was kept at 25° C. by flowing a cooling water through the jacket. The discharged solution was controlled so as to have a pH of from 10 to 11. The reaction solution thus obtained was left stand. After discarding the separated aqueous phase, 220 L of methylene chloride phase was collected. The polymerization degree of the polycarbonate oligomer was from 2 to 4, the concentration of the solution was 344 g/L and the concentration of chlorofomate groups was 0.75 N.

(Production of 100% PTBP-Terminated Polycarbonate Oligomer B)

Into a 1-L vessel equipped with a stirrer, were charged 261 mL of the polycarbonate oligomer A, 189 mL of methylene chloride, 16 g of PTBP, 2.7 μL of triethylamine, and a BPA solution which had been prepared by dissolving 22.3 g of bisphenol A into an aqueous solution of 12 g of sodium hydroxide and 45 mg of sodium dithionite in 135 g mL of water. The reaction was allowed to proceed for one hour with stirring at 300 rpm. After the reaction, 250 mL of methylene chloride was added and the resultant mixture was separated into an organic phase and an aqueous phase. The organic phase was successively washed with 15%-volume portions of 0.2 N hydrochloric acid, 0.03 N aqueous solution of sodium hydroxide and 0.2 N hydrochloric acid, and then with pure water repeatedly until the electric conductivity of the washings reached 0.1 μm or below. By removing methylene chloride, a flaky 100% aryl carbonate group (PTBP)-terminated polycarbonate oligomer B was produced, which had a number average molecular weight (Mn) of 1300, a weight average molecular weight (Mw) of 3700 and a molecular weight distribution (Mw/Mn) of 2.8. (Production of 100% OH-terminated polycarbonate oligomer C) Into a 100-L vessel equipped with a stirrer, were charged 1650 mL of the polycarbonate oligomer A, 1275 mL of methylene chloride, 1300 mL of water and 200 mL of a 28 wt % ammonia water, and the reaction was allowed to proceed for 2 h with stirring at 300 rpm. The reaction product mixture was centrifugally separated into an organic phase and an aqueous phase. The organic phase was successively washed with 15%-volume portions of 0.2 N hydrochloric acid, 0.03 N aqueous solution of sodium hydroxide and 0.2 N hydrochloric acid, and then with pure water repeatedly until the electric conductivity of the washings reached 0.1 μS/m or below. By removing methylene chloride, a flaky 100% OH-terminated polycarbonate oligomer C was produced, which had a number average molecular weight (Mn) of 1300, a weight average molecular weight (Mw) of 3700 and a molecular weight distribution (Mw/Mn) of 2.8.

(Production and Solid State Polymerization of Prepolymer)

Into a 300-L round-bottomed flask, were charged 7 g of the polycarbonate oligomer B, 3 g of the polycarbonate oligomer C, 0.26 mg of cyclohexyltriphenylphosphonium tetraphenylborate and 100 mL of methylene chloride, and the contents were stirred. Into the resultant uniform solution, 30 mL of acetone was added. Then, the solvent was removed by an evaporator to produce a powdery prepolymer (terminal end tate: PTBP/OH=70/30).

Into a SUS tube having a diameter of 58 mm and a length of 170 mm, 5 g of the powdery prepolymer produced was charged, and then the solid state polymerization was carried out at 190° C. for 2 h, at 210° C. for 2 h and at 230° C. for 4 h to produce polycarbonate. The number average molecular weight (Mn), the weight average molecular weight (Mw), the molecular weight distribution (Mw/Mn) and the ratio (PTBPIOH) between aryl carbonate groups (PTBP) and hydroxy groups (OH) constituting the terminal groups, each measured on the powdery prepolymer and the polycarbonate, are shown in Table 1.

COMPARATIVE EXAMPLE 4

A prepolymer was produced and solid state-polymerized in the same manner as in Comparative Example 3 except for using 3 g of the polycarbonate oligomer B and 7 g of the polycarbonate oligomer C. The number average molecular weight (Mn), the weight average molecular weight (Mw), the molecular weight distribution (Mw/Mn) and the ratio (PTBP/OH) between aryl carbonate groups (PTBP) and hydroxy groups (OH) constituting the terminal groups, each measured on the powdery prepolymer and the polycarbonate, are shown in Table 1.

TABLE 1

|  | Prepolymer | | | | After solid state polymerization | | | |
| --- | --- | --- | --- | --- | --- | --- | --- | --- |
|  | Mn | Mw | Mw/Mn | PTBP/OH | Mn | Mw | Mw/Mn | PTBP/OH |
| Examples | | | | | | | | |
| 1 | 2700 | 3500 | 1.3 | 44/56 | 22000 | 60200 | 2.7 | 18/82 |
| 2 | 3000 | 3700 | 1.2 | 57/43 | 22500 | 61000 | 2.7 | 89/11 |
| 3 | 2800 | 4000 | 1.4 | 67/33 | 21900 | 59000 | 2.7 | 92/8 |

TABLE 1-continued

|   | Prepolymer | | | | After solid state polymerization | | | |
|---|---|---|---|---|---|---|---|---|
|   | Mn | Mw | Mw/Mn | PTBP/OH | Mn | Mw | Mw/Mn | PTBP/OH |
| 4 | 2500 | 4300 | 2.1 | 19/81 | 21600 | 58300 | 2.7 | 10/90 |
| 5 | 2300 | 3300 | 1.4 | 55/45 | 19200 | 52000 | 2.7 | 89/11 |
| Comparative Examples | | | | | | | | |
| 1 | 3000 | 6400 | 2.3 | 0/100 | 3400 | 8200 | 2.6 | 0/100 |
| 2 | 2400 | 6000 | 2.5 | 52/48 | 10500 | 32000 | 3.0 | 75/25*[1] |
| 3 | 1300 | 3700 | 2.8 | 70/30 | 6900 | 20000 | 2.9 | 86/14 |
| 4 | 1300 | 3700 | 2.8 | 30/70 | 6450 | 19350 | 3.0 | 15/85 |

*[1] p-cumylphenol/OH

INDUSTRIAL APPLICABILITY

According to the present invention, by using a supported catalyst and a monovalent phenol in the oxidative carbonylation reaction, a polycarbonate prepolymer having a controlled molecular weight distribution and suitable for solid state polymerization is produced. Accordingly, the polycarbonates produced through solid state polymerization of the polycarbonate prepolymer of the present invention have also a controlled molecular weight distribution and show high performance characteristic of polycarbonates.

Therefore, the polycarbonate produced by the present invention is suitable for substrates of optical disks such as CD, CD-ROM, MO, CD-R, CD-RW, DVD-ROM, DVD-R, and DVD-RAM which require very high qualities.

What is claimed is:

1. A polycarbonate prepolymer for solid state polymerization, which is produced by an oxidative carbonylation reaction of an aromatic dihydroxy compound, and a monohydric phenol having a boiling point of 330° C. or below, carbon monoxide and oxygen,
    wherein the oxidative carbonylation reaction is conducetd in the presence of a catalyst composition comprising a carrier to which at least one compound selected from the group consisting of (a) a metal complex, (b) a compound having redox catalytic ability and (c) a compound capable of activating the aromatic hydroxy compound is bonded, and wherein
    (a) a ratio of aryl carbonate groups and hydroxyl groups, each constituting terminal groups of the prepolymer is from 2:8 to 8:2;
    (b) a molecular weight distribution (Mw/Mn) is from 1.1 to 2.1, wherein Mw is the weight average molecular weight of the polycarbonate prepolymer and Mn is the number average molecular weight of the polycarbonate prepolymer; and
    (c) a number average molecular weight (Mn) is from 1000 to 10000.

2. A process of producing polycarbonates comprising a step of solid state-polymerizing the polycarbonate prepolymer for solid state polymerization as defined in claim 1, thereby increasing a molecular weight thereof.

3. The polycarbonate prepolymer for solid state polymerization according to claim 1, wherein a ratio of aryl carbonate groups and hydroxyl groups, each constituting terminal groups of the prepolymer is from 3:7 to 7:3.

4. The polycarbonate prepolymer for solid state polymerization according to claim 1, wherein the number average molecular weight (Mn) is from 1500 to 8000.

5. The polycarbonate prepolymer for solid state polymerization according to claim 1, wherein the oxidative carbonylation reaction is conducetd in the presence of a catalyst composition comprising a carrier to which a metal complex is bonded.

6. The polycarbonate prepolymer for solid state polymerization according to claim 1, wherein the oxidative carbonylation reaction is conducetd in the presence of a catalyst composition comprising a carrier to which a compound having redox catalytic ability is bonded.

7. The polycarbonate prepolymer for solid state polymerization according to claim 1, wherein the oxidative carbonylation reaction is conducetd in the presence of a catalyst composition comprising a carrier to which a compound capable of activating the aromatic hydroxy compound is bonded.

8. The polycarbonate prepolymer for solid state polymerization according to claim 1, wherein the aromatic dihydroxy compound is bisphenol A.

9. The polycarbonate prepolymer for solid state polymerization according to claim 1, wherein the monohydric phenol having a boiling point of 330° C. or below is phenol, o-cresol, m-cresol, p-cresol, p-tert-butylphenol, p-tert-octylphenol, p-tert-amylphenol, p-methoxyphenol, p-chlorophenol, trichlorophenol or p-bromophenol.

10. The polycarbonate prepolymer for solid state polymerization according to claim 1, wherein the monohydric phenol having a boiling point of 330° C. or below is p-tert-butylphenol.

* * * * *